US006945410B2

(12) United States Patent
Stibbard

(10) Patent No.: US 6,945,410 B2
(45) Date of Patent: *Sep. 20, 2005

(54) AUTOMATIC TRANSFER TABLE FOR A WOODWORKING MACHINE

(76) Inventor: James Spenser Stibbard, Box 2387, High Prairie, Alberta (CA), T0G 1E0

( * ) Notice: Subject to any disclaimer, the term of this patent is extended or adjusted under 35 U.S.C. 154(b) by 241 days.

This patent is subject to a terminal disclaimer.

(21) Appl. No.: 10/330,408

(22) Filed: Dec. 30, 2002

(65) Prior Publication Data

US 2003/0121837 A1 Jul. 3, 2003

Related U.S. Application Data

(62) Division of application No. 09/905,554, filed on Jul. 16, 2001, now abandoned.

(51) Int. Cl.$^7$ .............................................. B65G 47/14
(52) U.S. Cl. ...................... 209/517; 209/518; 198/396; 198/345.1; 198/397.01
(58) Field of Search ................................. 209/517, 518, 209/521, 539, 656, 657, 571; 198/345.1

(56) References Cited

U.S. PATENT DOCUMENTS

| | | | |
|---|---|---|---|
| 3,250,372 A | 5/1966 | Wagner et al. .............. | 198/396 |
| 3,590,974 A | 7/1971 | Loveless ................. | 198/396 X |
| 3,771,641 A | 11/1973 | Jonsson et al. ............. | 198/396 |
| 3,774,753 A | 11/1973 | Jones ......................... | 198/396 |
| 4,039,108 A | 8/1977 | Hahn et al. ................. | 226/171 |
| 4,246,943 A | 1/1981 | Cromeens ................... | 144/245 |
| 4,429,784 A | 2/1984 | Cromeens ................... | 198/744 |
| 5,617,910 A | 4/1997 | Hill ............................ | 144/356 |
| 6,189,682 B1 | 2/2001 | Hill ............................ | 198/718 |
| 6,568,523 B2 * | 5/2003 | Stibbard ..................... | 198/396 |

* cited by examiner

Primary Examiner—Donald P. Walsh
Assistant Examiner—Jonathan R Miller
(74) Attorney, Agent, or Firm—Christensen O'Connor Johnson Kindness PLLC

(57) ABSTRACT

The invention is an automatic, unmanned, powered, variable speed transfer table for a finger joint machine which receives a controlled supply of blocks from a lineal block feeder. The slat chain is composed of two chain loops, connected at regular, equal intervals by slats. The slat chain pushes blocks over an even ending conveyor which aligns them to the inside of one of the chains and then over a moisture detecting system. Blocks containing unacceptable moisture fall through a gap in the working table while blocks with acceptable moisture are pushed by the slats over a door covering the gap and onto an outfeed table. The slats are synchronized to the lugs on the finger joint machine's lug chain and deposit correctly aligned and orientated blocks precisely on the lug chain. The slat chain then rotates upward and loops back over the working table and then down, under the infeed conveyor to re-emerge at the even ending conveyor.

11 Claims, 6 Drawing Sheets

DIRECTION OF TRAVEL →

AUTOMATIC TRANSFER TABLE FOR A WOODWORKING MACHINE

REFERENCES CITED

| 6,189,682 | Feb. 20, 2001 | Hill | 198/718 |
|---|---|---|---|
| 5,617,910 | Apr. 8, 1997 | Hill | 144/356 |
| 4,429,784 | Feb. 7, 1984 | Cromeens | 198/744 |
| 4,246,943 | Jan. 27, 1981 | Cromeens | 144/245 |
| 4,039,108 | Aug. 2, 1977 | Hahn et al. | 226/171 |

CROSS-REFERENCE TO RELATED APPLICATIONS

This is a division of application Ser. No. 09/905,554 filed on Jul. 16, 2001 now abandoned.

FEDERALLY SPONSORED RESEARCH OR DEVELOPMENT

Not Applicable

MICROFICHE APPENDIX

Not Applicable

BACKGROUND OF THE INVENTION

Finger jointing machines are used to mill joints in the ends of random lengths of lumber, hereafter referred to as "blocks". Glue is applied to the joints and the blocks are pressed together to form longer pieces of lumber. This is an oversimplification of a precise, complicated process known as finger jointing, but the focus of this invention is the accurate feeding of finger joint machines with blocks, not the process of finger jointing blocks.

This invention relates generally to an apparatus that requires no human operator and that accepts a controlled delivery of blocks from a linear block feeding means, ensures that every block has an acceptable moisture content and delivers a consistent, correctly aligned and correctly orientated supply of blocks at precise intervals to the finger joint machine's lug or slat chain at a lineal speed that is determined by that finger joint machine.

This invention applies to finger joint machines which use either a chain with lugs spaced at regular intervals thereon or a plurality of chains connected by slats at regular intervals to push a block through the said machine's shaper head or heads. The former type of finger joint machine is referred to as a lug chain finger joint machine and the latter is known as a slat chain finger joint machine. The phrase "lug chain" includes the "finger joint lug chain" and the "finger joint slat chain", but the phrase "finger joint slat chain" may be used herein when necessary. Lugs or slats attached to the lug chain are referred to as "lugs" herein, ignoring the difference between a lug and a slat. For clarity, the longitudinal left hand end of any apparatus is defined herein as the infeed, where blocks are deposited to be eventually fed to the finger joint machine, unless otherwise illustrated in an accompanying drawing. The right hand end of the same apparatus is defined as the outfeed where blocks are deposited on the finger joint machine. The direction of travel is assumed herein to be from left to right and upstream refers toward the infeed and downstream refers toward the outfeed. The words "sprocket" and "chain" may sometimes refer to a multiplicity of sprockets and/or chains, but the singular is generally used.

Historically, finger joint machines were supplied with blocks manually. FIG. 1 illustrates the steps required to place blocks on a lug chain manually. A supply means 1 deposits blocks 2 on an accumulation table 4, where a person 3 picks up a block 2, aligns and places it on the finger joint machine's 6 lug chain 7. Human dexterity became incapable of placing a block in each lug 5 of the lug chain 7 as lug speed and operating speed increased. Empty lugs represent lost production, increased costs and less profit. Workers also suffer injuries while placing blocks manually on lug, thereby increasing production costs with production down time, employee sick leave, various forms of compensation, new operator training and rehabilitation of the injured worker.

Mechanical lug loaders were invented to supplement or replace manual lug loading and work with varying degrees of success. Some individuals, such as Hill, U.S. Pat. No. 6,189,682, U.S. Pat. No. 5,617,910, Cromeen, U.S. Pat. No. 4,429,784, U.S. Pat. No. 4,246,943, Hahn et al., U.S. Pat. No. 4,039,108, and others, were awarded patents for their inventions. Others put their inventions to work in their own manufacturing operations without patent protection.

Lug loaders have generally comprised four separate means to accomplish the task of placing blocks on lug: a supply means, a powered accumulation means, a control means and a powered transfer means.

FIG. 2 illustrates the steps required to load a finger joint machine's lug chain 7 with blocks 2 using a lug loader (sensors and electronic means required to control the lug loader have not been shown).

A supply means 1, which may be a vibrating conveyor, belt conveyor, or some other means, deposits blocks 2 in a haphazard and random fashion on an accumulation means 9, where a person 3 manually picks up a block 2, orientates it in a side-by-side, parallel manner with other blocks 2 with its widest face down and one of its ends aligned to a fence 8, which represents a datum line that continues to the finger joint machine's own fence. A fence 8 may be understood as an obstruction that runs longitudinally along one side of the accumulation means 9 from its infeed to its outfeed in a more or less straight line. Workers must ensure that blocks 2 always maintain contact with the fence 8 and that blocks 2 remain at right angles to the fence 8, because block ends may not be milled correctly by the finger joint machine 6, if they are placed on the lug chain 7 at some distance from the fence 8.

The block is then moved under the powered brush hold down 12 on the accumulation means 9 and is pushed in the direction of travel until it is stopped at the control means 10. The control means 10 releases blocks 2 onto the transfer means 11 at intervals synchronized with the lugs 5. Synchronization may be achieved by electrical or mechanical means and various means, such as levers or pinch rolls employing pressure cylinder means, are used to release blocks from the accumulation means 9 to the transfer means 11.

The transfer means 11, that bridges the gap between the accumulation means 10 and the lug chain 7 is the focus of this invention. Prior art transfer means have generally been comprised of two features: a form of table that blocks lie on and an overhead conveying means. The table generally has a low coefficient of friction and may be comprised of sheet metal, skate wheels, or synthetic materials such as UHMW, which encourage the overhead conveying means 12 to push the block 2 across the transfer table 11 smoothly. The overhead conveying means 12, which may be comprised of a powered brush hold down or a powered, narrow polyethylene belt conveyor, applies pressure against the block 2 and pushes it across the transfer table 11 and deposits the blocks 2 on the lug chain 7. Overhead conveying means 12 usually require precise adjustment for block thickness to work satisfactorily, otherwise malfunctions may occur.

Problems often occur when block lengths vary significantly, for example 5½" to 55", because the longer length blocks tend to push around the shorter blocks on the accumulation table and under the powered hold down. Problems also occur on the transfer table because one end of a block is controlled better than the other. In each case, this causes one end of the block to lag behind the other, which may cause the block to move away from the right angled orientation required by the finger joint machine. Various means, such as powered hold down brushes, have been developed to remedy this problem, with limited success, and manual intervention is usually required to ensure satisfactory block alignment for the control means.

A finger joint machine may tolerate some poor orientation and misalignment, but mismanufacture and/or damage may occur if blocks become seriously disturbed, especially if a block jams between the finger joint machine's lugs.

Another embodiment of a transfer means is illustrated in FIG. 3 and uses a large transfer table 11 with a plurality of chains 14 with lugs 15 attached at regular intervals which usually mimic the lug spacing on the finger joint machine's lug chain 7. The transfer chain 14 is usually driven by the finger joint machine 6 and may be linked directly by sprocket and chain means 16 to the finger joint machine 6 or may use a short transfer plate and an overhead brush feeder, similar to that shown in FIG. 2. In all cases, the transfer chain 14 returns underneath the transfer table 11. Even ending rolls may be located longitudinally between the transfer chains 14 to align one end of each block 2 against a fence 8.

Blocks 2 are aligned in a linear block feeding means 18, which releases blocks 2 to the transfer table 11 at regular intervals timed to the passage of lugs 15 on the chain 14. This presupposes that blocks are singularized and oriented for positioning in the linear block feeding means 18 at a distance from the transfer table 11.

This transfer method controls and maintains blocks 2 in alignment better than the previous methods lug loading methods described above, but each lug 14 and each chain way 17 represent possible obstructions to blocks as they are fed on to the transfer table 11 by the linear feed conveyor 18. Blocks can become misaligned between lugs or ricochet off the lugs or chain ways when they hit an obstruction at high speed. The invention does not present such obstacles to the blocks: it uses a smooth belt, a smooth, flat table and solid slats thereby eliminating obstructions.

Prior art transfer tables and lug loaders do not include a means to determine block moisture content and a means to process those blocks with unacceptable moisture content. However, block moisture content is critical to the glueing and glue curing process of finger joint lumber manufacturing, because incorrect block moisture content may cause glue line failure and the rejection of a manufacturing shift's total production output.

This invention differs from prior art significantly in the use of moisture detectors and an overhead return slat chain. The machine will align blocks accurately, reject blocks with unacceptable moisture content and deposit blocks at precise and controlled intervals on the lug chain, regardless of block length variance, and at any lineal speed that the lug chain may run at. No manual labor or adjustments are required of the invention.

BRIEF SUMMARY OF THE INVENTION

Transfer tables move a metered supply of blocks from a supply means on to a finger joint machine's lug or slat chain. Various means have been invented to supply finger joint machines with an automatic, continuous supply of random length blocks. Hill, U.S. Pat. Nos. 6,189,682 and 5,617,910, Cromeens, U.S. Pat. Nos. 4,429,784 and 3,927,705, and Hahn et al., U.S. Pat. No. 4,039,108, each describe a method to feed blocks to finger joint machines and these means are known to persons knowledgeable in the art. Each machine utilizes some form of transfer table.

This invention is a novel and ingenious departure from the prior art and comprises an automatic block transfer table, complete with a means to even end blocks to a fence, detect the moisture content of each block and to reject blocks with unacceptable moisture content, and a means to dispense blocks to the finger joint machine's lug chain at precisely defined intervals. The invention will operate throughout the lug chain's lineal speed range without adjustment or interruption and performs this continuously, automatically and accurately and does not require manual labor.

The invention will process variable width, thickness and length blocks. The preferred embodiment of the invention is one that will process blocks ranging in width from 2½" to 9¼", thickness ranging from ⅝" to 2¼" and lengths ranging from 5½" to 55", although the invention may process additional block dimensions.

The invention is comprised of a working table, an even ending conveyor, a moisture sensing area, a door that opens to drop out blocks with unacceptable moisture and an outfeed plate. These are linked together by a novel slat chain which moves above the working table, as opposed to conventional transfer tables which have the chain descending below the transfer table.

The invention relies upon a regular, controlled, supply of blocks that are deposited on the working table in a regular controlled manner by a linear block feeding means. Block delivery to the working table is synchronized to the movement of the slats. (Neither the linear block feeding means nor the means to control block delivery to the working table are subjects of this invention). The linear block feeding means releases one block per slat and the slats push each block across an even ending conveyor, which moves blocks transversely to contact the inside edge of one of the slat chains. This particular side of the slat chain is aligned with the finger joint machine's fence, thereby ensuring that block ends are aligned to the finger joint machine's fence.

Blocks are then pushed across a short, flat table by the slats and then across a moisture detecting means. Any blocks with unacceptable moisture fall through a gap, which is created when the moisture detecting means causes a door to open, onto a conveying means which removes them to another area. (This conveying means is not considered to be part of this invention). Blocks with acceptable moisture are pushed across the said door onto an outfeed plate.

The preferred embodiment of this invention includes a block moisture detecting means, a gap through which blocks with unacceptable moisture content fall, a door to cover the said gap and a control means to operate the said door. However, the moisture detecting means and its associated elements may be omitted.

Contrary to other transfer tables, whose conveying means move downward to loop back to the infeed, the slats push blocks across the outfeed plate and then move upward away from the outfeed plate, thereby allowing a flat, unbroken outfeed table that lies just above the finger joint machine's lug chain. This ensures that blocks are always under control and that the slats always deposit blocks at the end of the outfeed table in the same, precise location.

Blocks maintain continuous contact with the slats along their length, which eliminates those problems caused by block lengths encountered by some transfer tables. Similarly, there are no lugs for the blocks to slip between. The slat chain controls each block and prevents incorrectly aligned blocks, thereby ensuring correct lateral alignment to the finger joint machine. The slats are synchronized to the finger joint machine's lugs, therefore every block, regardless of its width or length, is always deposited on the lug chain in the same orientation, alignment and precise location at any lineal speed determined by the finger joint machine's lug chain.

An important feature of this invention is that there are no obstructions or obstacles that blocks can hang up on or ricochet off, unlike the individual lugs and chain ways associated with conventional lug chain transfer tables. This is a most important consideration if the finger joint machine is operating at high speed. For example, blocks have only one half second to move from the linear feed mechanism on to a lug chain or slat chain if the finger joint lug chain moves at 120 lugs per minute. This means that a 24" block must move at 240 lineal feet per minute, whereas a 48" block must move at 480 lineal feet per minute. It is possible for blocks to become misaligned between lugs and/or ricochet off the lugs or chain ways and become airborne projectiles at these speeds, resulting in possible damage and/or injury.

Another important feature of this invention is that it is uncomplicated and easy to install over a finger joint machine and only requires a sprocket and chain linkage between the two machines to drive it.

In summary, the invention accepts a controlled delivery of blocks from a linear block feed means, aligns them to a fence, ensures that every block has an acceptable moisture content and delivers a consistent, correctly aligned supply of blocks at precise intervals to the lug chain at a speed determined by the finger joint machine. This is performed automatically without human intervention or adjustment.

Please note that the linear block feed means and the unacceptable block moisture conveyor are shown in some drawings to illustrate their locations and functions. Neither item is considered as part of this invention, as stated above.

DETAILED DESCRIPTION OF THE INVENTION

Finger joint machines may be referred to as right hand or left hand machines. A right hand machine is one that has the closest machining means on the right hand side of the finger joint machine, if one stands at the infeed end of the finger joint machine and looks toward its outfeed end. All drawings associated with this invention show a machine feeding a right hand finger joint machine, but it is understood that a mirror image of the invention may also feed a left hand finger joint machine.

Figure 5:
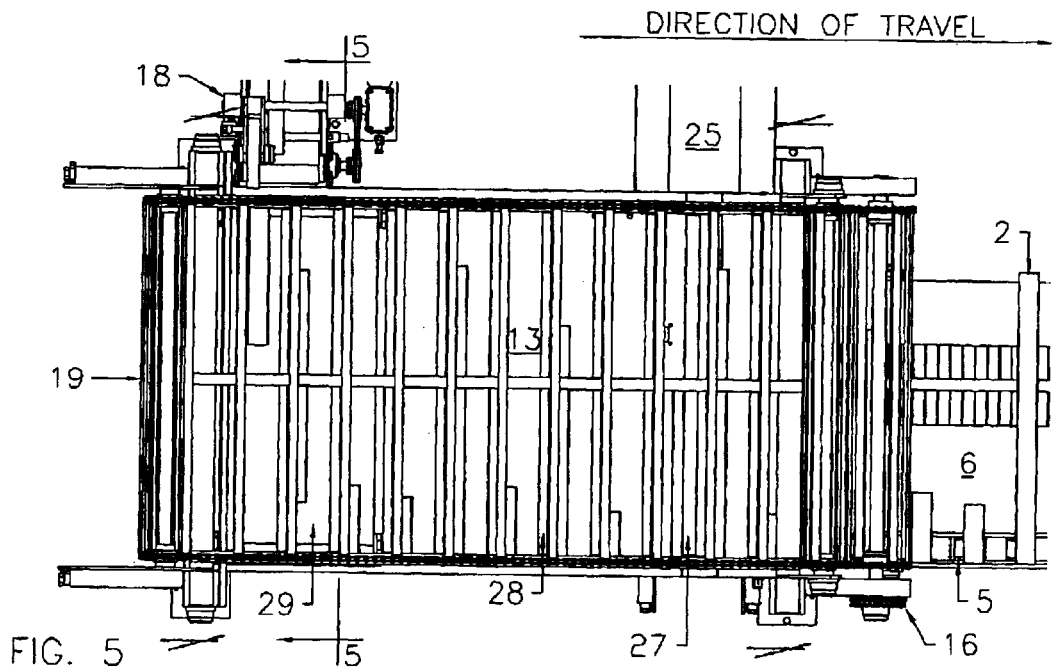
FIG. 5 is a plan view of the invention and defines one sectional view
Figure 6:
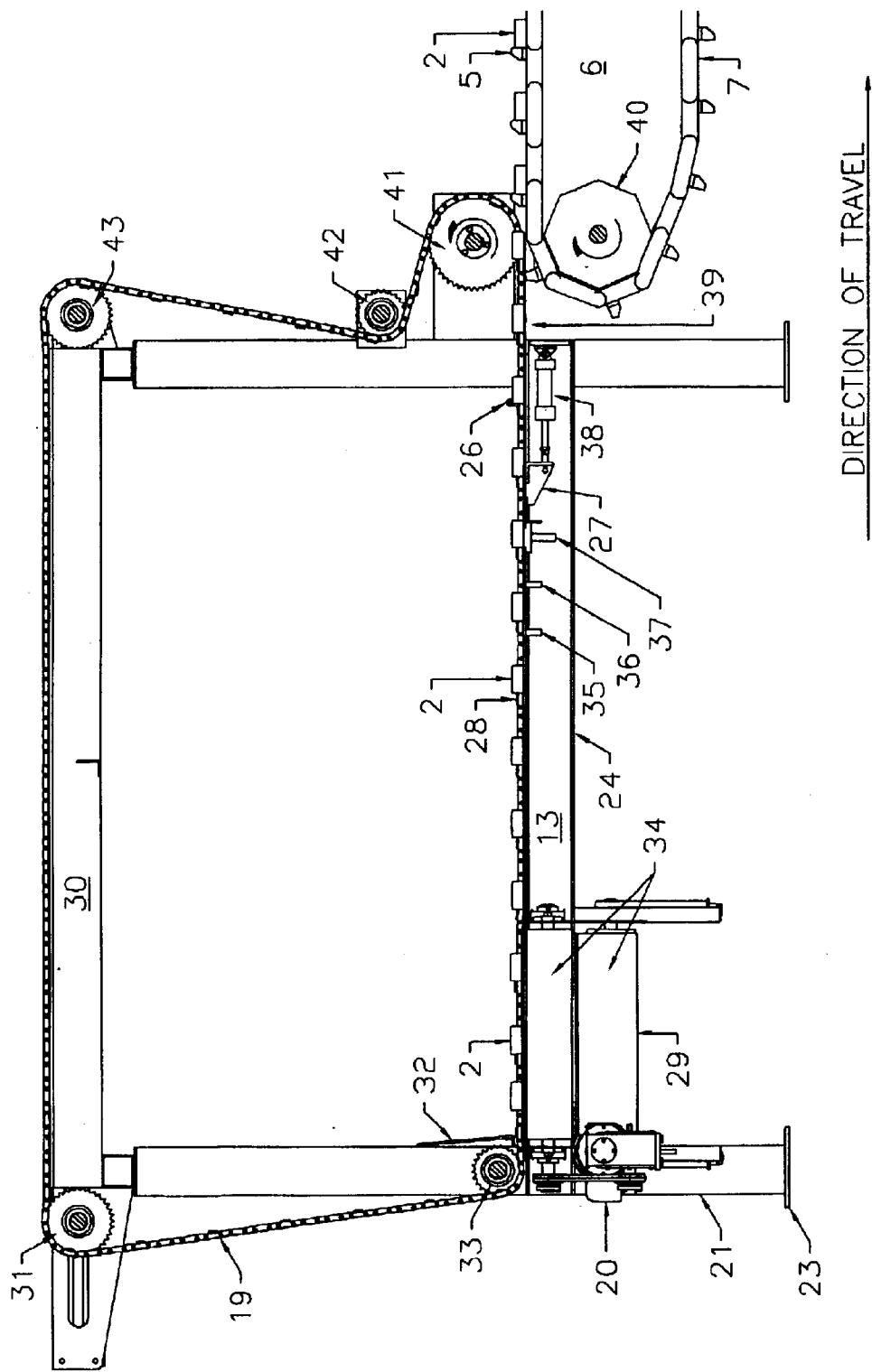
FIG. 6 is a section through the invention, defined in FIG. 4, and shows the slat chain configuration and major elements of the invention

Four columns 21 are joined by longitudinals 24 which support a working table 13, at a comfortable manual working height above floor level, for example 34 inches, and an upper frame which supports the slat chain carrier 30 above the working table 13. This is illustrated in FIGS. 4, 6, 7 and 8. The working table 13 is comprised of an even ending conveyor 29, one or more moisture detecting means 37 (FIGS. 6, 8), a door 27 (FIGS. 4, 5, 6, 8) covering a gap through which blocks having unacceptable moisture drop, and an outfeed plate 39 (FIGS. 6, 8).

Each column 21 is fitted with a footplate 23 comprising a plate and a height adjustment means 22 (FIGS. 4, 7, 8), which allows precise vertical adjustment of the invention relative to the finger joint machine 6. It is understood that fine height adjustments may be accomplished by many means, such as jacking bolts, shims, spacers, grouting and other means familiar to persons knowledgeable in the art.

A slat chain 19 overlays the even ending conveyor 29 (FIG. 6) and moves over the moisture detecting means 37, over the drop out door 27 that covers the unacceptable moisture drop out gap, and the outfeed plate 39. It then loops upward around the drive sprockets 41, around the outfeed end's idler sprockets 42, around the upper idler sprockets 43, horizontally back towards the infeed end over the slat chain carrier 30 attached to the upper frame and around the rear upper idler sprockets 31, down and around the rear idler sprockets 33 to complete the slat chain's 19 endless loop at the even ending conveyor 29.

Figure 1:
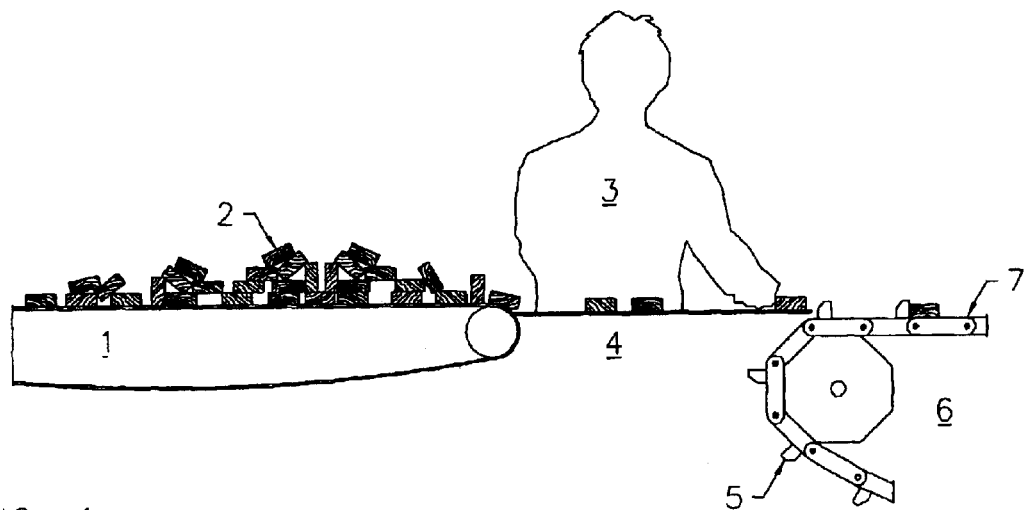
FIG. 1 illustrates the steps required to load a finger joint machine with blocks manually.
Figure 2:
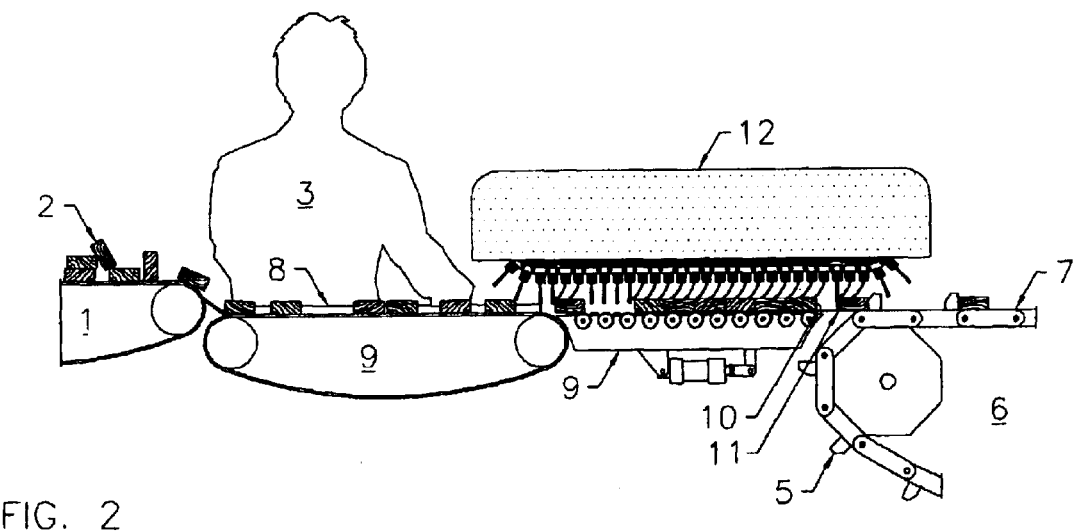
FIG. 2 shows the steps required to load a finger joint machine with blocks using a lug loader.
Figure 3:
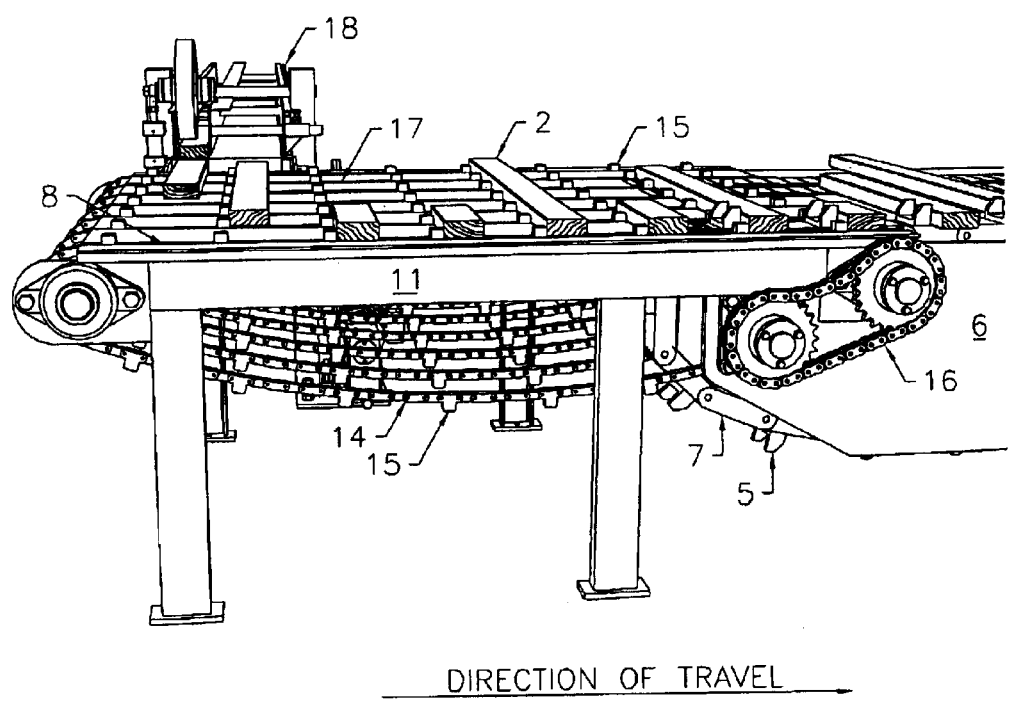
FIG. 3 shows a transfer table using a lug chain.
Figure 4:
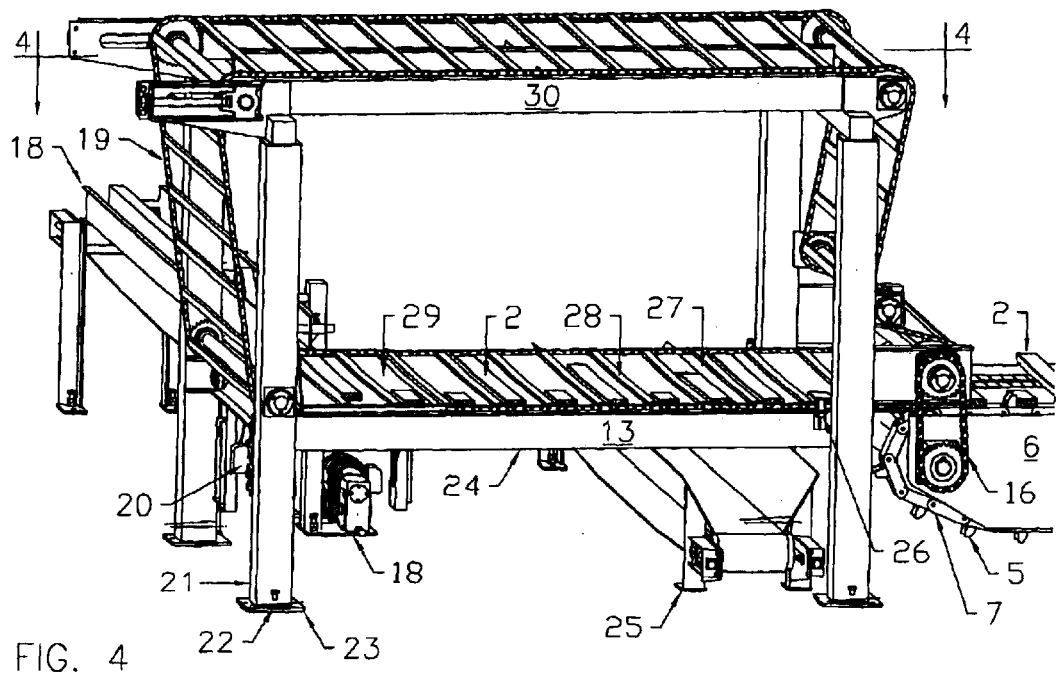
FIG. 4 is a perspective view of the invention and defines one sectional view.
Figure 7:
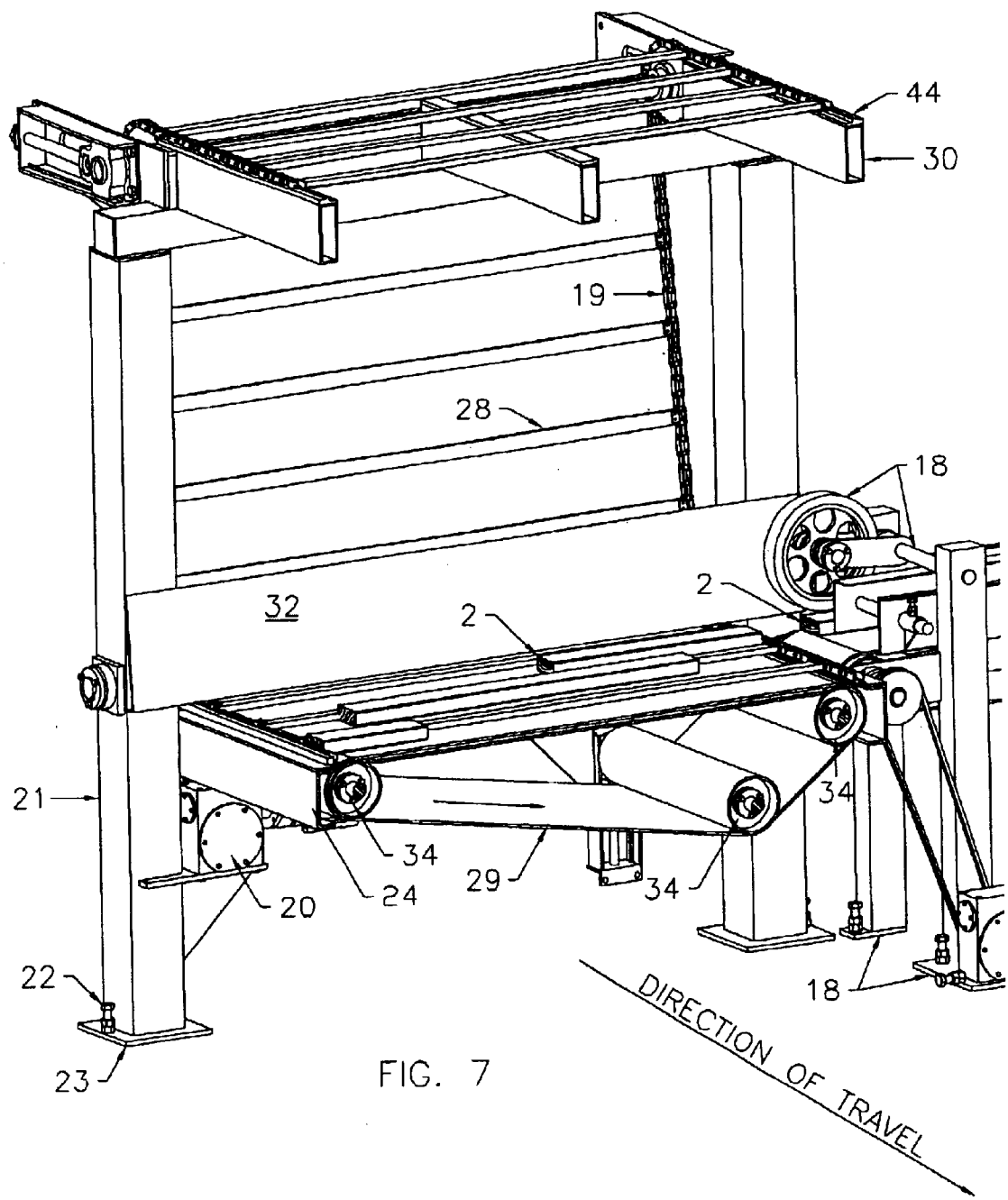
FIG. 7 is a sectional view of the infeed end of the invention, defined in FIG. 5, illustrating the even ending conveyor.
Figure 8:
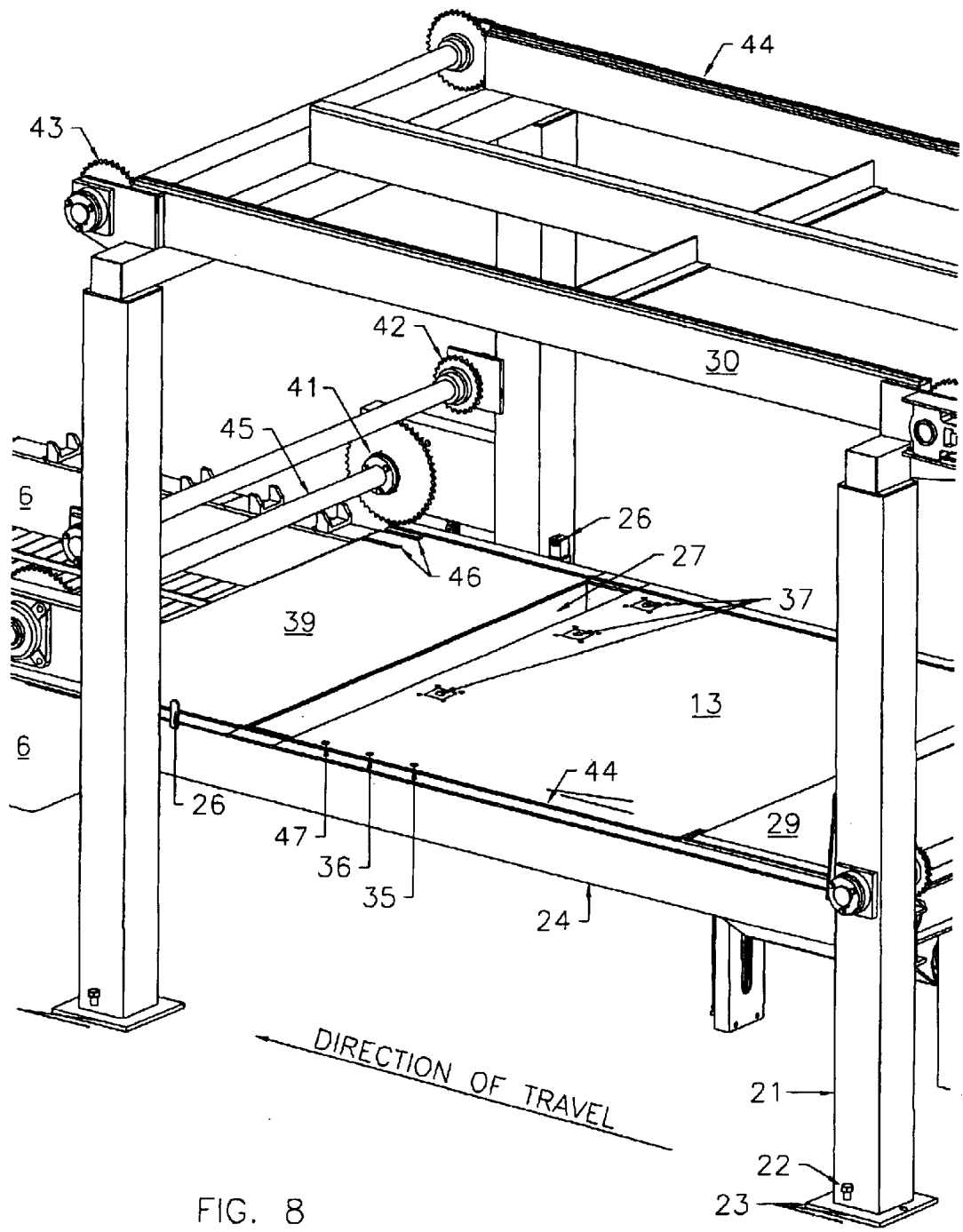
FIG. 8 is a perspective view showing the outfeed end of the transfer table. The slat chain is not shown for clarity.

The slat chain 19 is comprised of two strands of chain 19 which are connected in two endless loops (FIGS. 4, 7). The preferred embodiment of this chain is an extended pitch chain, but other suitable chains or belts may be substituted. Slats 28 connect both chains 19 at regular intervals (FIGS. 4, 6, 7), which may mimic the finger joint machine's lug intervals, for example 6, 9 or 12 inch spacing The result is that the slat chain 19 resembles a continuous, wide, flexible ladder. The slat chain is guided by wear strips attached longitudinally, in the direction of travel, to both sides of the working table and the upper chain carrier 44 (FIGS. 7, 8). The preferred embodiment of slats 28 is steel tubing or steel bar stock although other material such as wood or plastic may be substituted. The preferred embodiment of all wear strips employed by this invention is a synthetic material such as UHMW, but other materials may be substituted.

The slat chain 19 is driven by sprockets 41 (FIG. 6) which are rotated by a drive shaft 45 (FIG. 8). The slats 28 must be exactly synchronized with the finger joint machine's lugs 5, so that a slat 28 on the slat chain 19 and a lug 5 on the lug chain 7 arrive consistently in precise juxtaposition at the transfer table's outfeed, as shown in FIG. 6. If synchronization between slats 28 and lugs 5 is maintained, objects placed ahead of the slats 28 must be deposited on the lug chain 7 correctly in relation to the lugs 5. Therefore, the preferred embodiment of a means to rotate the drive shaft 45 (FIG. 8) is a sprocket and roller chain means 16 (FIG. 4)

linking the drive shaft or tail shaft 40 (FIG. 6) of the finger jointer's lug chain 7 to the invention's drive shaft 45 (FIG. 8). This ensures a strict mechanical linkage between the slat chain 19 and the lug chain 7.

Other means are permissible to drive the slat chain 19, if an exact and precise correlation between the slats 28 and the lugs 5 is maintained throughout the lug chain's 7 entire lineal speed range.

The transfer table is supplied with blocks 2 by an electronically controlled linear feed means 18 (FIGS. 4,5,6,7), which feeds blocks from one side of the transfer table. This linear feed means does not represent part of this invention and is well understood by persons knowledgeable in the art. The linear feed means is synchronized to the passage of the slats 28 and releases one block 2 per slat. A guard 32 prevents blocks 2 falling off the back end of the working table 13 and jamming in the slat chain 19. The slat 28 then pushes each block 2 across a powered even ending conveyor 29 (FIGS. 4,5,7).

The even ending conveyor 29 lies transversely between the slat chain's two chain loops 19, and is comprised of an endless belt 29, a plurality of rollers 34, shafts and bearings, whose means are well known to persons knowledgeable in the art. This is illustrated in FIG. 7. A belt conveyor is the preferred embodiment of the even ending conveyor although other means, such as slat chain conveyors or rollers, might also be employed. The even ending conveyor 29 generates enough friction between itself and the wide face of blocks 2 and is driven at an adequate speed to ensure that blocks 2 are moved laterally across the face of the slats 28. This motion aligns one end of the blocks 2 to a common datum or fence, namely the side straps of one of the chains comprising the slat chain 19 as shown in FIG. 7.

The even ending conveyor 29 is driven by a roller 34 which is rotated by an electric motor through a gearbox 20, sheaves and belt means (FIGS. 4,6,7). An electric motor, controlled by a frequency drive, represents the preferred even ending conveyor drive means embodiment, but a hydraulic drive motor or direct drive linkage to the slat chain or finger joint machine's lug chain are alternatives.

The slats 28 push blocks 2 off the even ending conveyor 29 and across the working table where blocks may be inspected for quality, if required. One or more moisture detecting means 37 are embedded laterally across the working table 13 (FIGS. 6, 8). (The slat chain is not shown in FIG. 8 to improve clarity). This is the preferred mounting position although the moisture detecting means 28 could also be mounted over the blocks 2 on some means such as an arm. The slats 28 push blocks 2 over the moisture detecting means 37 which sense the moisture content of each block 2.

Each moisture detecting means 37 may be adjusted to detect a specific moisture content, which permits a plurality of moisture detecting means 37 to sense excess moisture, insufficient moisture or a range of moisture conditions. Block moisture content is critical to the glueing and glue curing process of finger joint lumber manufacturing, because unacceptable block moisture content may cause glue line failure and the rejection of a manufacturing shift's total production output.

A slat sensing means 47 (FIG. 8), located in line with the moisture detecting means 37, disables the moisture detecting means 37, if a slat 28 is above the moisture detecting means 37. This prevents false signals emanating from the moisture detecting means 37 (FIGS. 6, 8). The preferred embodiment of all slat sensing means employed by this invention is a reflected light photo sensor, but beam interruption photo sensors, transducers or mechanical switches could also be used.

An unacceptable block moisture drop out gap is located in the working table 13 between the slat chains 19 adjacent to the outfeed side of the moisture detecting means 37 (FIGS. 4, 5, 6, 8). The said gap is covered by a door 27, which lies flush with the working table 13, thereby allowing slats 28 to push blocks 2 over the said gap. The door 27 is comprised of a plate which is opened and shut by the operation of a pressure cylinder means 38 connected to the door 27 and the invention's support structure, as shown in FIG. 6.

A pneumatic cylinder is the preferred embodiment of this pressure cylinder, but hydraulic or electric means may also be employed.

The pressure cylinder means 38 is controlled by a solenoid valve means, if it is a pneumatic or hydraulic pressure cylinder means, or a by a switching means if electric. The moisture detecting means 37 enables a slat sensing means 35, when it senses a block 2 containing unacceptable moisture. When the slat sensing means 35 senses a slat 28, it enables another slat sensing means 36 and also activates the solenoid valve or switch, which causes the door 27 to open. The open door 27 is shown in FIG. 8. The slat 28 pushes the block 2 over the said gap in the direction of travel, thereby causing the block 2 to fall through the said gap onto a conveying means 25, which removes the block 2 to an area where blocks can be accumulated (FIG. 4). The slat sensing means 36 activates the solenoid valve or switch and causes the door 27 to be closed when it detects a slat 28. These sensors are shown in FIGS. 6 and 8.

The arrangement of slat sensors 35, 36, and 47 detailed in FIG. 8, allows the opening and closing of the door 27 to be adjusted precisely and represents the preferred embodiment of the door control means, although other electronic means may be employed.

The conveying means 25 (FIG. 4) receiving the unacceptable moisture content blocks is well known to persons skilled in the art and does not represent part of this invention. Its preferred embodiment is a belt conveyor and its presence is necessary to the efficient functioning of the invention.

The slats 28 push blocks 2 with acceptable moisture content over the door 27 onto the outfeed plate 39, which is comprised of a material such as steel plate (FIG. 6, 8).

The preferred embodiment of this invention includes a block moisture detecting means 37, a gap through which blocks with unacceptable moisture content fall, a door 27 to cover the said gap and a control means to operate the said door, as detailed above. However, the moisture detecting means and its associated elements may be omitted.

A block sensing means 26, located above the outfeed plate 39 and adjacent to the door 27, is adjusted to sense any object protruding above the blocks lying on the working table 13 and will stop the invention's drive means if a protruding object is sensed (FIG. 4, 6, 8). This prevents protruding objects moving further toward the outfeed end and eliminates the possibility of jamming and damage. The preferred embodiment of the said block sensing means 26 is a beam interruption photo sensor, but reflected light photo sensors or mechanical switches could also be used.

At this stage, blocks have been aligned to the fence and any blocks containing an unacceptable moisture content have been dropped out of the flow.

The outfeed plate 39 is the same width as the working table 13 and extends longitudinally from the outfeed side of the door 27 to a position that is below the head shaft 45 (FIG. 6, 8). It lies over a portion of the lug chain 7 at the finger joint machine's infeed, as shown in FIG. 6.

There has been no differentiation, until this juncture, between lug chain finger joint machines and slat chain finger joint machines. Therefore, the above lug chain finger joint machine's tail sprocket 40 (FIG. 6) may also be considered as a slat chain finger joint machine's tail sprocket. However, two or more slots 46 (FIG. 8) must be made in the edge of the outfeed plate 39, if the finger joint machine is a lug chain finger joint machine, which will permit the lugs 5 to rotate through the outfeed plate 39 (FIG. 6). This is not required if the finger jointer is a slat chain finger joint machine.

The invention must be precisely aligned vertically, horizontally and laterally to ensure that the outfeed plate 39 lies just above the lug chain 7 and causes no obstruction to the lug chain 7 or its lugs 5. This is illustrated in FIG. 6. Precise vertical alignment is achieved using the height adjustment means 22 (FIG. 4, 7, 8). Precise lateral positioning of the invention is required: slats 28 and lugs 5 must be parallel. Similarly, the inside edge of the slat chain 19, described above as a fence, must be in line with the finger joint machine's fence. This ensures that blocks 2 will be correctly aligned laterally to the finger joint machine and that their ends will be milled correctly. The head shaft 45, the finger joint machine's tail spool 40 and the end of the outfeed plate 39 should be in approximate vertical alignment (FIG. 6). This will align the invention and finger joint machine 6 longitudinally to allow the slats 28 to deposit the blocks 2 precisely on the lug chain 7, as shown in FIG. 6.

Blocks 2 are pushed across the outfeed plate 39 by the slats 28 and are deposited precisely on the lug chain 7 as the slat chain 28 moves upward (FIG. 4, 6). The finger joint machine's lugs 5 rotate upwards behind each deposited block 2 and are precisely synchronized with the slats 28, as described above. The lugs 5 contact the block 2 and push the block 2 away from the transfer table and through the finger joint machine 6. Meanwhile, the slat chain 19 moves upward around its drive sprockets 41 and idler means 42, 43 and over its supporting chain carriers 30, located above the working table, to loop around the rear idlers 31, 33 to the infeed end of the invention and the even ending conveyor 29 (FIG. 4, 6).

In summary, the invention is an unmanned, automatic, variable speed transfer table which, receives a controlled supply of blocks from a linear block feeder and delivers them to a finger joint machine's lug chain. The slat chain pushes blocks over an even ending conveyor, which aligns the ends of blocks to the inside of the slat chain. Blocks are then pushed across a moisture sensing means, which causes a door to open if a block's moisture content is unacceptable. Blocks with unacceptable moisture content drop out of the system and those with acceptable moisture content are pushed across the closed door. The moisture detecting means and its associated elements may be omitted.

Finally, blocks are pushed across the outfeed plate by the slats and are deposited correctly aligned and correctly orientated at precise intervals on the finger joint machine's lug chain at any lineal speed determined by the finger joint machine.

This is performed without a human operator.

INDUSTRIAL APPLICABILITY

The invention is envisaged as an unmanned, automatic, transfer table for a finger jointing machine, although it is applicable to other woodworking machines performing similar end matching operations It should not, however, be limited only to lumber or wood materials since it is applicable to handling any random length and width object that requires that the objects be aligned and positioned precisely on a conveyor.

While the invention has been disclosed in its preferred form, it is to be understood that the specific embodiment thereof as disclosed and illustrated herein is not to be considered in a limited sense and changes or modifications may be made without departing from the spirit of the invention.

I claim:

1. An automatic transfer table for a finger joint machine to receive block in coherent order and to align the said blocks against a fence, to detect the moisture content of the said blocks and to reject any said blocks having an unacceptable moisture content and to dispense the said blocks with acceptable moisture content to a woodworking machine at controlled, precise intervals throughout the said woodworking machine's operating speed range and comprising:

a powered slat chain comprised of two endless, same length, powered chains exactly spaced apart and connected by a plurality of slats located at regular, equal intervals on the said chains;

a slat chain head shaft assembly, comprising a rotatable shaft and a plurality of drive sprockets, bearings and a driven sprocket, which causes the said slat chain to move within the invention;

a plurality of slat chain idler assemblies, comprising shafts, idler sprockets and shaft collars, which support and guide the said slat chain within the invention;

a support structure, to which the said slat chain head shaft assembly and the said slat chain idler assemblies are attach, comprising an infeed end and an outfeed end and a plurality of columns, including height adjusting means located on a foot plate of each of the said columns, a working table attached to the columns and an upper horizontal frame attached to the said columns;

an even ending conveyor, supported by the working table, which receives the said blocks from an independent supply conveyor and carries the said blocks towards one of the said spaced apart chains and which is located adjacent to the infeed end of the apparatus and lies transversely within the said lower horizontal frame and between the said spaced apart chains and which may be driven by an electric motor through a gearbox, sheave and belt means;

the said working table further comprised of a plate extending the width of the invention and from the said even ending conveyor to an outfeed plate and further comprising an unacceptable block moisture drop out gap;

a plurality of slat chain wear strips supporting the said slat chains and running longitudinally beneath the said spaced apart chains from the infeed end of the working table to the outfeed end of the said outfeed late adjacent to the sides of the said working table;

one or more moisture detecting means, located adjacent to the outfeed side of the said even ending conveyor, which detect the moisture content of the said blocks;

a door, located on the outfeed side and adjacent to the said moisture detecting means, which closes the said unacceptable block moisture drop out gap thereby allowing the said slats to push the said blocks containing acceptable moisture across the said unacceptable block moisture drop out gap and onto the outfeed plate;

a first slat sensing means, adjacent to and transversely in line with the said moisture detecting means, which enable the said moisture detecting means, if no slat is above the said moisture detecting means;

a pressure cylinder means, attached to the said door and the said working table, which is operated by a solenoid valve means and causes the said door to open and close;

a second slat sensing means, located in the said working table, which is enabled by the said moisture detecting means and, if it detects a said slat, activates the said solenoid valve means, thereby causing the said pressure cylinder to operate and open the said door to allow said blocks containing unacceptable moisture to fall through;

a third slat sensing means, located in the said working table, which is enabled by one of the said first or second slat sensing means and, if it detects a said slat, activates the said solenoid valve means, thereby causing the said pressure cylinder to operate and close the said door;

an over height sensing means, located adjacent to the outfeed side of the said door, which causes the said slat chain to stop, if it senses any object protruding above the said blocks;

the said outfeed plate comprising a plate, extending the width of the said working table and from the outfeed side of the said door to the outfeed end of the invention and adjusted, by the said height adjusting means, to lie superior to the said finger joint machine's lug chain or said finger joint machine's slat chain which permits the said slats to push the said blocks over and off the said outfeed plate onto the said finger joint machine's lug chain or said finger joint machine's slat chain;

a plurality of slots cut in the said outfeed plate, if a finger joint lug chain is employed by the said finger joint machine, to accommodate the passage of the said finger joint lug chain's lugs through the said outfeed plate;

a plurality of chain carriers, located on the said upper frame, which support the said slat chain;

a plurality of slat chain wear strips attached longitudinally to the upper face of the said chain carriers and supporting said slat chain.

2. An automatic transfer table or a woodworking machine to receive blocks in a coherent order and to dispense the blocks to a woodworking machine at controlled, precise intervals throughout the woodworking machine's operating speed range, comprising:

a support structure including an infeed end, an outfeed end, a working table and several vertically extending support columns;

a powered slat conveyor supported by the support structure, the powered slat conveyor including two endless, same length, powered loops exactly spaced apart and connected by a plurality of slats located at intervals on the said loops, an upward portion of said loops being supported by the support columns, a lower portion of said loops extending across the working table;

means for driving the powered slat conveyor;

an even ending conveyor, supported by the support structure, which carries the blocks towards one of the spaced apart loops and which lies transversely to the support structure;

the working table having an outfeed plate extending the width of the working table and being adapted to lie superior to one of a lug chain or a slat chain of a finger joint machine which permits the slats to push the blocks over and off the outfeed plate onto one of the lug chain or the slat chain.

3. The automatic transfer table as defined in claim 2, wherein there is provided a horizontal frame between an upper end of the vertically extending support columns.

4. The automatic transfer table as defined in claim 2, wherein the powered slat conveyor uses spaced apart chains.

5. The automatic transfer table as defined in claim 2 wherein the means for driving the powered slat conveyor includes:

a slat chain head shaft assembly, comprising a rotatable shaft and a plurality of drive sprockets, bearings and driven sprockets, which causes the slat chain to move within the apparatus;

a plurality of slat chain idler assemblies, comprising shafts and idler sprockets, which support and guide the slat chain within the apparatus;

the slat chain the head shaft assembly and the slat chain idler assemblies being attached to the support structure.

6. The automatic transfer table as defined in claim 5, wherein a plurality of chain carriers are provided, the plurality of chain carriers being located on the support structure, which support the slat chain.

7. The automatic transfer table as defined in claim 4, wherein the even ended conveyer is positioned between the spaced apart chains.

8. The automatic transfer table as defined in claim 2, wherein the working table is further comprised of a plate extending the width of the apparatus and from the even ending conveyor to the outfeed plate and further comprising an unacceptable block moisture drop out gap.

9. The automatic transfer table as defined in claim 2, wherein means is provided to detect moisture content of the blocks and to reject any of the blocks having an unacceptable moisture content and to dispense the blocks with acceptable moisture content to a woodworking machine.

10. The automatic transfer table as defined in claim 9, wherein there is provided one or more moisture detecting means which detect the moisture content of the blocks;

a slat sensing means which enables the moisture detecting means; and means located adjacent to the working table, which is enabled by the moisture detecting means, if it detects blocks with unacceptable moisture, to direct the blocks containing unacceptable moisture to the unacceptable block moisture drop out gap.

11. The automatic transfer table as defined in claim 2, wherein a plurality of slots are cut in the outfeed plate such that if a finger joint lug chain is employed by the finger joint machine, the plurality of slots accommodate the passage of the finger joint lug chains lugs through the outfeed plate.

* * * * *

UNITED STATES PATENT AND TRADEMARK OFFICE
CERTIFICATE OF CORRECTION

PATENT NO. : 6,945,410 B2
DATED : September 20, 2005
INVENTOR(S) : J.S. Stibbard It is certified that error appears in the above-identified patent and that said Letters Patent is hereby corrected as shown below:

Column 10,
Line 14, "to receive block" should read -- to receive blocks --.
Line 35, "attach," should read -- attached, --.
Line 57, "late" should read -- plate --.

Column 11,
Line 3, "enable" should read -- enables --.
Line 42, "porting said" should read -- porting the said --.
Line 44, "table or" should read -- table for --.

Column 12,
Line 26, "slat chain the head shaft" should read -- slat chain head shaft --.
Line 61, "chains lug" should read -- chain's lugs --.

Signed and Sealed this

Thirty-first Day of January, 2006

JON W. DUDAS
*Director of the United States Patent and Trademark Office*